April 10, 1934.     O. D. McFARLAND     1,954,454
FLUID-TIGHT JUNCTURE AND METHOD OF PACKING SAME
Filed Nov. 23, 1929
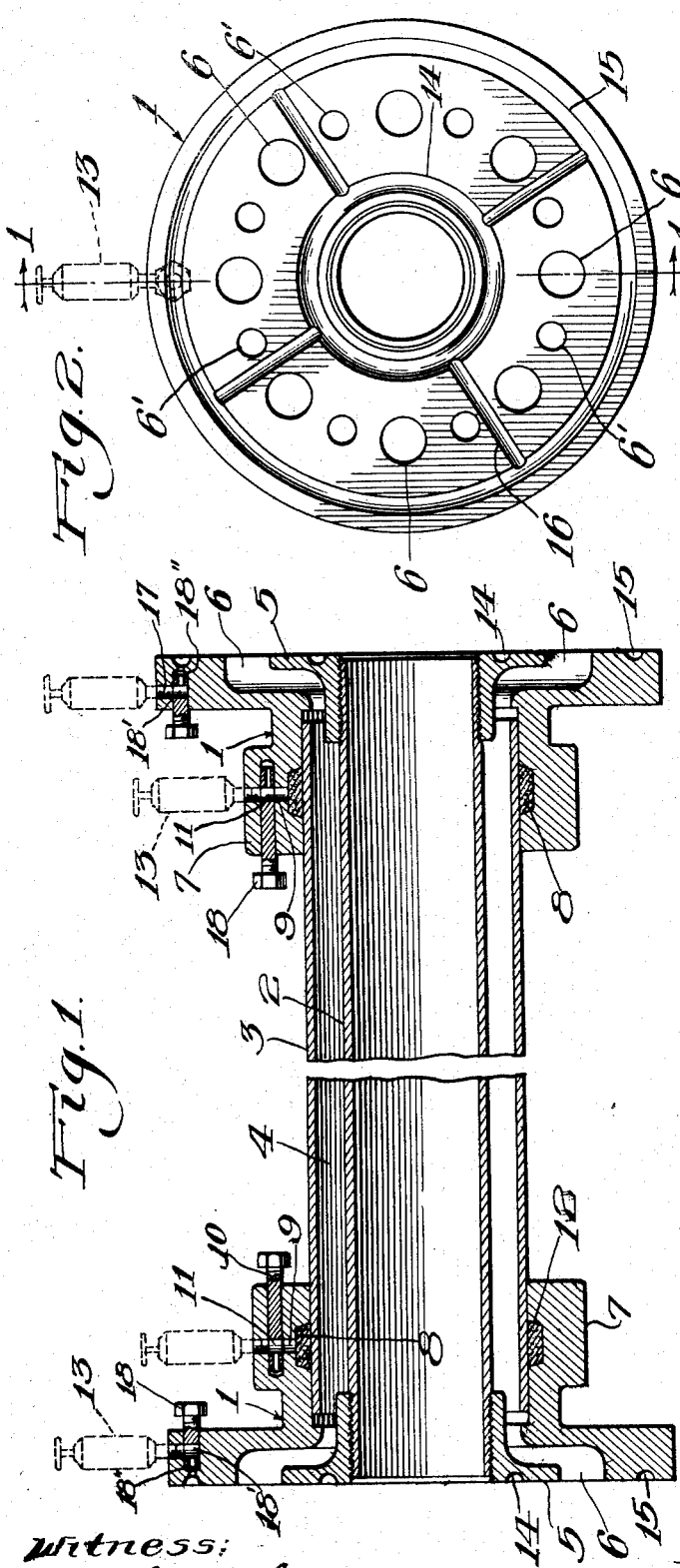
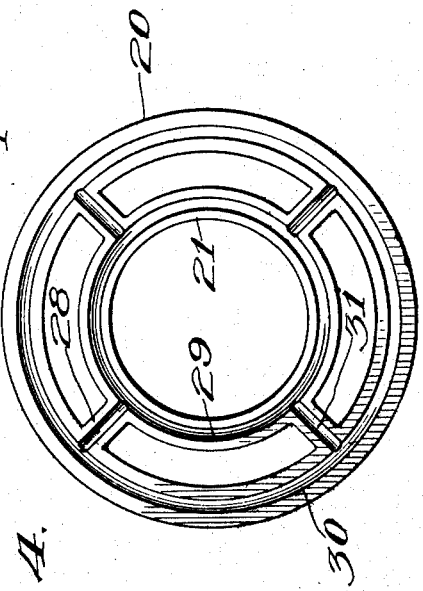
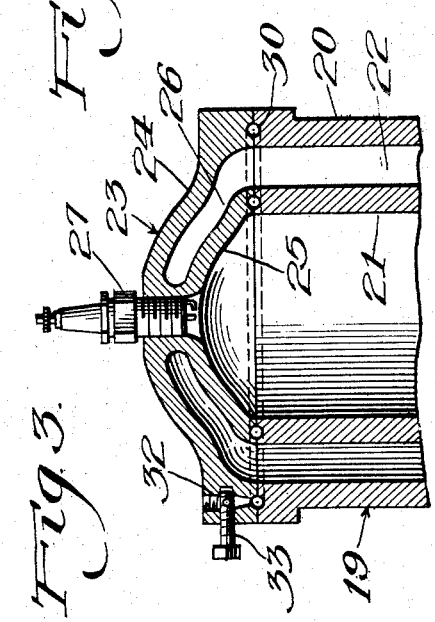
Inventor:
Owen D. McFarland,
By Frank L. Belknap
Atty Patented Apr. 10, 1934

1,954,454

UNITED STATES PATENT OFFICE 1,954,454

FLUID-TIGHT JUNCTURE AND METHOD OF PACKING SAME

Owen D. McFarland, Chicago, Ill., assignor, by mesne assignments, to Asphalt Process Corporation, New York, N. Y., a corporation of New Jersey Application November 23, 1929, Serial No. 409,296

9 Claims. (Cl. 285—22)

This invention relates to the packing of couplings and junctures of conduits, receptacles, fittings, or the like, adapted to convey or hold a fluid, for the purpose of rendering said junctures fluid-tight and preventing leakage.

One of the important objects of my invention is to provide a method whereby a mobile plastic or semi-liquid packing may be inserted under pressure between two abutting surfaces to render the juncture fluid-tight.

An important feature of the invention resides in the ease with which sufficient packing may be maintained under pressure between two abutting surfaces to render the juncture fluid-tight, said juncture being susceptible to being repacked without the necessity of dismantling the connection or rendering the system inoperative.

Among the classes of apparatus in which my invention may be used, may be mentioned: steam jacketed pipe lines, fittings and couplings; steam jacketed pumps; water cooled internal combustion engines; air lines, gas lines, water lines, steam lines, and in general any place where gaskets or other packing elements have heretofore been used.

Briefly described, my invention comprises grooving the faces of one or both of the abutting surfaces, inserting into the grooves a mastic or semi-liquid packing material under pressure, and maintaining said material under pressure. The material which I have found to be most desirable for use is a prepared substance having a composition which will be hereafter described.

One additional feature of my invention resides in the provision of a jacketed coupling which may be effectively packed with a mobile plastic packing, the constructional details of which are such that an efficient leak-proof coupling is provided.

Other and further important objects and advantages of the present invention will be more apparent from the following description.

In the drawing, Fig. 1 is a sectional view taken on the line 1—1 of Fig. 2, illustrating the invention as applied to a jacketed pipe coupling.

Fig. 2 is a face view of the same coupling, showing the packing channels.

Fig. 3 is a vertical cross sectional view of a water-jacketed combustion cylinder.

Fig. 4 is a top plan view of the cylinder, as shown in Fig. 3, with the head removed.

Referring in detail to the drawing, 1 indicates generally a coupling for a jacketed pipe line, which may comprise an internal pipe 2 and a concentrically disposed outer pipe 3 of larger diameter than the pipe 2, providing an annular space 4 between the two pipes.

Piping systems of this character are common to many industries and may be used for the conveyance of road oil, asphalt, tar, varnish, molasses, rubber solutions, grain mash, heavy oils, creamery products, soap stock, caustic soda solutions, cement, lard, margarine, glucose, packing house products, tanner's waste, paraffins, heavy crude oils, syrups, chocolate, fondant, cream, and many other like products which are characterized by relatively high viscosity at ordinary temperatures. In the conveyance of such substances, they are passed through the inner pipe 2 while a heating medium, such as steam, heated gas, hot liquid or the like is passed through the space 4. In this manner the material in the inner pipe 2 is heated by conduction from the heated jacket and reduced to a condition where it will readily flow.

Heretofore, considerable difficulty has been experienced in securely packing couplings and various other fittings used in the makeup of a jacketed pipe line, as it is apparent that the possibility of leakage in such a system is more than double the possibility of leakage occurring in the usual pipe line.

In coupling a pipe line of this character, it can be seen that four pipe junctures must be secured against leakage in one unit of the system. The inner pipe 2 may be screw threaded at each end to the inner portion 5 of the coupling 1. By this means leakage at the juncture of the inner pipe and the members 5 may be prevented. But, for obvious reasons, the outer pipe cannot be threadedly engaged with the coupling 1. Hence the junctures of the outer pipe and the couplings must be packed.

The proper packing of the abutting faces of the two half couplings presents a more difficult problem, inasmuch as the inner material pipe, and the outer material pipe must each be packed, since leakage from the material pipe to the heating space and vice versa must be prevented, and in addition, leakage from each of these two lines to the atmosphere must be prevented. The accepted method of preventing these leakages has heretofore consisted in inserting a conventional gasket between the two faces of the couplings and then bolting the two flanges together, care being taken so far as possible that the flanges were bolted under an even pressure. It has been realized in the art that this task of applying to each of the bolts a uniform pressure was substantially impossible and, hence leakages have been of frequent occurrence. Another difficulty attendant upon this type of coupling resided in the fact that, upon failure of a gasket, the whole piping system was shut down and rendered inoperative until a new gasket could be supplied.

In the utilization of my invention as applied to the packing of jacketed couplings, for example, the inner or material pipe 2 may be threaded to a portion 5 of the half couplings 1. The couplings 1 may be cored or apertured, as shown at 6 in Figs. 1 and 2, the apertures being adapted to communicate with the space 4. A series of bolt holes 6' may be interspaced between the apertures 6, the bolt holes and the apertures 6 having the same circular center line. In this manner, when the abutting faces of the two half couplings 1 are drawn together by bolts (not shown) the maximum pressure exerted by the bolts will be applied immediately adjacent the adjoining apertures 6. Thus, upon joining two such half couplings, a continuous space for the conveyance of a heating medium will be provided. The neck or collar portion 7 of the coupling 1 may be provided with an annular packing space 8, the neck 7 being adapted to encompass the free ends of the pipe 3, as best shown in Fig. 1.

A communicating aperture 9 may join the packing space 8, controlled by a cock 10 provided with a registering opening 11. The packing 12 adaptable for use in my invention may be of such character as to be insertable into the opening 9 and thence into the packing space 8 by means of a gun 13 or other pressure device, diagrammatically shown in dotted lines in Fig. 1. The cock 10 is then closed, maintaining the packing material under pressure between the abutting surfaces.

I have found that a material consisting of a filler of asbestos or other fibrous substance and finely drawn lead wire with a binder of glycerine and graphite is highly suitable for use with my invention, although it is to be understood that I do not wish to be limited thereto, inasmuch as the invention contemplates the use of any suitable mastic or semi-liquid packing material.

To pack the juncture of the two opposing faces or flanges of the half couplings, two symmetrical concentric annular grooves may be provided in each face of the half couplings, an inner groove 14, which insulates the material duct from the heating ducts, and an outer groove 15 which separates both ducts from the atmosphere. A plurality of connecting grooves 16 may also be provided between the grooves 14 and 15.

To insert the mastic packing in the grooves a port 17 may be utilized, similar to the aperture 9, and provided with a control cock 18 similar to cock 10. By this arrangement, the mastic material may be inserted under a pressure, say of approximately 100 to 250 pounds per square inch, more or less, into the groove 15, and by means of the connecting ducts 16 to the inner groove 14 where it may be maintained under the insertion pressure.

The cock 18 may be provided with a transverse aperture 18' which in turn is intersected by a longitudinal aperture 18" which opens at the end of the cock. The plastic material forced into the aperture 17 passes through the transverse duct 18' and then through the longitudinal aperture 18" to the outer groove 15.

Of course, it is to be understood that the packing may be inserted while the opposing faces are in contact with each other, and if a leak occurs, the packing can be replenished without involving the partial dismantling of the system.

It is to be understood, of course, that the use of a mastic or semi-fluid packing as used in connection with jacketed pipe fittings constitutes but one group of instrumentalities wherein my invention may be used, and I do not wish to be limited thereto, since many other fields are open to the use of my invention. For example, referring particularly to Figs. 3 and 4, the numeral 19 indicates generally a portion of a water jacketed combustion engine cylinder. The cylinder 19 may comprise a water jacket 20 surrounding a cylinder wall 21 providing a water circulating space 22 therebetween. The cylinder 19 may be provided with a head 23, fastened to the cylinder by any suitable means, (not shown). The head 23 may comprise an outer wall 24 and an inner wall 25, a water circulating space 26 being provided therebetween and communicating with the space 22. The usual spark plug 27 may be disposed in the top of the head 23. The cylinder wall 21 may be joined to the jacket 20 by means of the members 28, as shown best in Fig. 4. A pair of concentric annular grooves may be provided in the upper face of the cylinder 19, an inner groove 29 and an outer groove 30 connected by the grooves 31 provided in the connecting members 28. A registering and symmetrical arrangement of grooves may also be provided in the lower abutting face of the head 23. An opening 32 may be provided in the head 23 and may communicate with the outer groove 30, the opening being adapted to accommodate the nozzle of a pressure device similar to the gun 13 in Fig. 1. A valve cock 33 may intersect the opening 32 at right angles and is adapted to open or close the same in a similar manner to the cocks 10 and 18 in Fig. 1.

The arrangement is such that, when the cylinder head 23 is bolted upon the cylinder 19, the cock 33 may be opened and, by means of a pressure device similar to 13, a mastic or semi-liquid packing may be inserted into the grooves 30, 29 and 31 and the cock closed, thereby effectively sealing the juncture of the cylinder head and the cylinder.

Many other uses for my invention may suggest themselves, but I do not wish to be limited to any one group of instrumentalities inasmuch as the invention in its broadest aspect contemplates the introduction under pressure of a mastic or semi-liquid packing material between two abutting surfaces, and the maintaining of said material under pressure to render the juncture of the two surfaces fluid tight.

It is apparent that I have provided a method of packing couplings, fittings, pumps, cylinder heads and many other devices, which is both speedy and efficient. A juncture of two surfaces may be packed and rendered fluid tight without the necessity of mechanically disjoining the two surfaces, in other words, packing can be replenished while the apparatus to be packed is in operation, thus insuring continuous operation. By the use of my invention many pieces of apparatus heretofore deemed indispensable have been eliminated, such as, packing glands, gaskets and the like.

By the terms "mobile plastic", "mastic", and "semi-liquid" as used in the specification and claims is meant a packing material which is susceptible of being injected under pressure into grooves provided in the opposed surfaces to be packed and susceptible of being maintained under pressure therein.

I claim as my invention:

1. In combination, an annular flange having a central passageway, the face of said flange being grooved to provide a recess adjacent said passageway in free communication with a second recess adjacent the outer edge of said flange, the body of the flange being apertured to provide bolt holes and heating fluid passageways, the bolt holes and heating fluid passageways being disposed adjacent each other on substantially the same circular center line.

2. In combination, an annular flange having a central passageway, one face of which flange is grooved to provide an annular recess adjacent said passageway in free communication with a second annular recess adjacent the outer edge of said flange, the body of the flange being apertured to provide bolt holes and heating fluid passageways, said bolt holes and heating fluid passageways being disposed adjacent each other and on substantially the same circular center line.

3. In combination, an annular flange having a central passageway, the face of said flange being grooved to provide a recess adjacent said passageway in free communication with a second recess adjacent the outer edge of said flange, said flange being provided with a peripheral extension having an aperture communicating with said second recess and normally closed by a movable cock.

4. In combination, an annular flange having a central passageway, the face of said flange being grooved to provide a recess adjacent said passageway in free communication with a second recess adjacent the outer edge of said flange, said flange being provided with a rearwardly projecting collar having a packing receiving opening, and a movable cock normally closing said opening.

5. In combination, an annular flange having a central passageway, the face of said flange being grooved to provide a recess adjacent said passageway in free communication with a second recess adjacent the outer edge of said flange, said flange being provided with a peripheral extension having an aperture communicating with said second recess and normally closed by a movable cock, said flange being also provided with a rearwardly projecting collar having a packing receiving aperture and a movable cock normally closing said aperture.

6. In combination, two devices having abutting surfaces and formed with communicating passages, respectively opening through said surfaces, means for securing said surfaces in abutting relation, said devices having two annular recesses between the abutting portions thereof located one within the other and, surrounding said passages, mastic packing material under pressure filling said recesses.

7. In combination, devices having abutting surfaces and formed with passages respectively passing through said surfaces, said devices being provided with two annular endless recesses between the abutting portions thereof located one within the other, means for connecting said recesses, and a mastic packing material filling said recesses.

8. A joint for a fluid pressure retaining vessel comprising two members having abutting surfaces faced for mutually conforming contact, said joint having a fluid passage other than an opening of the vessel and extending through the members transversely of said surfaces, at least one of said surfaces having therein an open groove closed when the surfaces are in contact to form a recess capable of retaining a plastic packing under pressure, said groove being so arranged in said faced surface as to surround said transverse passage with the recess interposed in the path of possible leakage to or from said passage along the surface of the members and in the path of possible leakage between said passage and the vessel.

9. A joint for a fluid pressure retaining vessel comprising two members having abutting surfaces faced for mutually conforming contact, said members having a plurality of passages other than openings of the vessel and passing transversely through the faces respectively in alignment in the two members, the faces of said members having therein a plurality of open grooves closed when the faces are in contact to form recesses capable of retaining a fluid pressure, said grooves each being so arranged in said faces as to surround a transverse passage with a recess interposed in the path of possible leakage to or from the said passage, at least one of said faces also being provided with a groove forming a recess when the faces are in contact and connecting all said recesses surrounding said transverse passages.

OWEN D. McFARLAND.